Feb. 25, 1969  W. FRIEDRICHSEN ET AL  3,429,654
REACTING GASES OR VAPORS IN A FLUIDIZED BED
Filed Oct. 29, 1965
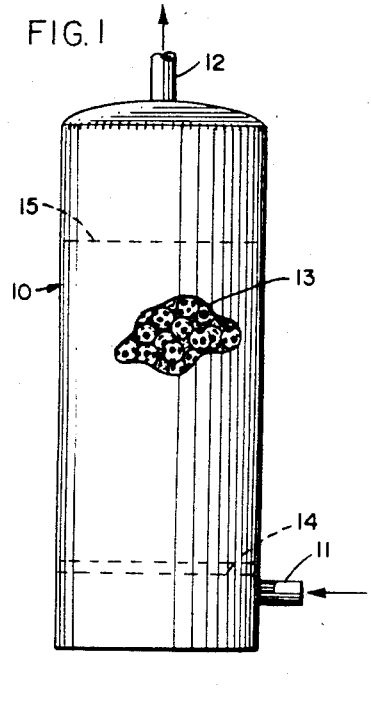
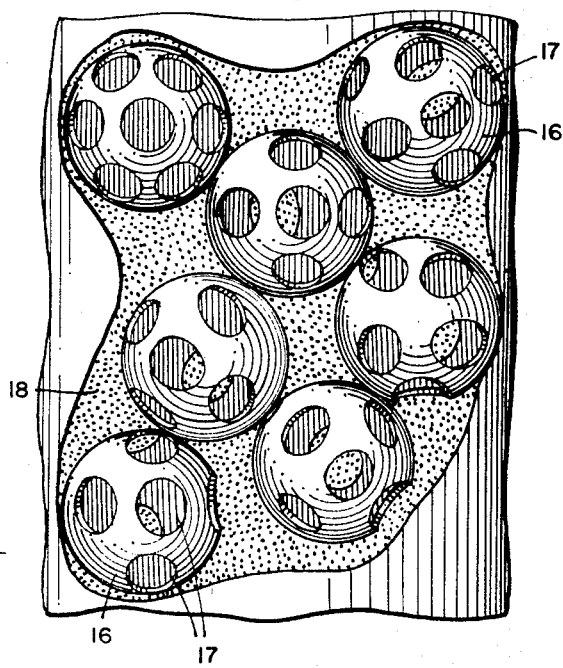
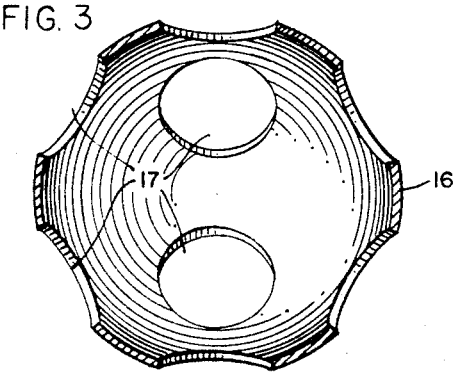
INVENTORS:
WILHELM FRIEDRICHSEN
ANTON WEGERICH
BY: *Marzall, Johnston, Cook & Root*
ATT'YS

United States Patent Office 3,429,654
Patented Feb. 25, 1969

3,429,654
REACTING GASES OR VAPORS IN A FLUIDIZED BED
Wilhelm Friedrichsen, Ludwigshafen (Rhine), and Anton Wegerich, Limburgerhof, Pfalz, Germany, assignors to Badische Anilin- & Soda Fabrik Aktiengesellschaft, Ludwigshafen (Rhine), Germany
Filed Oct. 29, 1965, Ser. No. 505,749
Claims priority, application Germany, Nov. 5, 1964, B 79,207
U.S. Cl. 23—1                8 Claims
Int. Cl. B01j 9/22, 11/06; C07b 1/00

ABSTRACT OF THE DISCLOSURE

Process and apparatus for fluidized bed reactions of gasiform chemicals in reaction zone containing perforated hollow sphere packing and fluidized, finely divided solids serving as catalysts and/or inert particles.

---

The present invention relates to a process in which gases or vapors are reacted in a fluidized bed of finely divided solids such as catalysts or inert material.

It is known that reactions between gases or vapors may be carried out in a fluidized bed of finely divided catalysts and/or inert substances. In this method the gas often moves through the fluidized bed in the form of large bubbles. Reacted gas or vapor is thus mixed with gas or vapor which has not yet reacted at all or has only reacted partially. This often results in undesired secondary reactions so that the yield of the desired product is diminished.

To minimize this disadvantage, it is known that stationary packing material, for example spheres, Raschig rings and the like, may be arranged in the fluidized bed. Although formation of large gas bubbles is substantially prevented in this way, the process is not entirely satisfactory because these packing materials considerably decrease the useful reaction space. Thus for example when using spheres as packing material, the useful reaction space is decreased by about 60%. When using Raschig rings there is the further disadvantage that a large number of dead spaces, in which inadequate fluidization of the solids takes place, are formed within the reaction zone.

It has therefore already been proposed with regard to the carrying out of reactions between gases and fine-grained substances in a fluidized bed to arrange within the fluidized bed, to improve contact between the gases and the fine-grained substances, cylindrical shapes from whose walls cut portions project into the interior of the cylinder. But here again there is the disadvantage that a large number of dead spaces is formed, which results in the yield being diminished.

It is an object of the present invention to react gases or vapors in a fluidized bed of finely divided catalysts and/or inert material without the formation of bubbles in the bed and without the formation of dead zones and which gives increased yields of the desired product.

This object is achieved in a fluidized bed having distributed therein hollow members with pierced walls when said hollow members are hollow spheres whose surfaces are provided with perforations.

By using perforated hollow spheres according to this invention, good fluidization of the solid particles is achieved throughout the entire fluidized bed and mixing of reacted gases or vapors with unreacted reactants is practically completely avoided. Furthermore the fluidized bed is subdivided into a plurality of intercommunicating fluidization zones. This results in a more intense mixing of the solids with the gases. As a result of this, the yield is considerably increased.

The hollow spheres may be made from any material which is inert and resistant to the reactants, for example metal or ceramic materials. The entire surface of the hollow spheres is pierced by perforations. The diameter of the openings should be at least about four times the diameter of particles of the fluidized material. The diameter of the spheres depends on the size of the fluidization reactor and may be 10 to 65 mm., preferably 20 to 50 mm., in the case of a reactor having a diameter of 1 meter. In general, the diameter of the spheres should be approximately $1/100$ to $1/15$, preferably about $1/50$ to $1/20$, of the diameter of the reactor. Thus, in a reactor having a diameter of 50 cm., hollow spheres whose diameter is 10 to 25 mm. are suitable. The size of the perforations is dictated by the size of the spheres. Spheres having a diameter of 10 to 50 mm. may advantageously have orifices having a diameter of about 2 to 7 mm., while in larger spheres the diameter of the openings will be chosen larger. The number of perforations is chosen so that the hollow sphere is not too greatly weakened mechanically.

It is advantageous to introduce the gases in such a way that the edge zones are supplied with a larger amount of gas per unit of surface than the central zones. This may be achieved for example by making the spacing of the perforations in the plate on which the spheres lie greater at the periphery than in the middle.

In the drawings:

FIG. 1 is a side elevation of a fluidized bed reactor containing the perforated, hollow spheres with a portion of the wall of the reactor broken away to show such spheres;

FIG. 2 is a fragmentary, enlarged view of a segment of the reaction zone, and illustrates the perforated spheres and fluidized particles in said zone; and FIG. 3 is an enlarged, diametric section of one of the perforated hollow spheres.

Referring to the drawings, FIG. 1 illustrates a conventional vessel 10 for carrying out a reaction in a bed of fluidized particles. The gaseous components are introduced near the bottom of the vessel through one or more pipes 11, and the gaseous products of reaction are discharged through an overhead pipe 12. In passage through the vessel 10, the gaseous reactants pass upwardly into a bed 13 of hollow, perforated spheres 16 suitably supported on a perforated plate 14. The upper level 15 of the spheres may be located at about the three-quater depth of the vessel 10.

The spheres 16 are hollow and have a plurality of openings 17 through which the gasiform reactants and/or products of reaction may pass in the upward flow thereof through the reactor 10. The fluidized particles, i.e., catalysts or inert substances, are maintained in the fluidized state by the flow of the gases through the reactor 10.

The process according to this invention is suitable in principle for all reactions carried out in a fluidized bed, irrespective of whether the process be carried out at atmospheric, subatmospheric or superatmospheric pressure. Examples which may be given are oxidation reactions, hydrogenation, for example of nitro compounds, nitriles or oximes to amines, dehydrogenations, alkylations, dealkylations, isomerizations, cracking, condensation reactions, polymerization reactions or carbonylation reactions. The solids forming the fluidized bed may be catalysts or inert materials, depending on the type of reaction to be carried out.

The invention is further illustrated by the following examples.

Example 1

(a) A reactor having a height of 3 meters and a diameter of 8 cm. is filled to the extent of three-quaters with hollow spheres of stainless steel having a diameter of 15 mm. Each sphere is provided with ten circular perforations which are uniformly distributed over the surface.

The diameter of each perforation is 5 mm. 5,000 ccm. of a catalysts of titanium and vanadium oxides having a particle size of 0.2 to 0.5 mm. is introduced into the reactor. 5,000 liters of air together with 200 g. of vaporized o-xylene are introduced per hour into the bottom of the reactor. A temperature of 390° C. is maintained in the reactor. 198 g. per hour of phthalic anhydride (equivalent to a yield of 99% by weight) is separated from the off-gas leaving the reactor.

(b) The reactor, instead of being charged with perforated spheres, is filled to the same level with cylinders having a diameter of 15 mm. and a length of 15 mm. and having portions cut from the wall projecting inwardly into the interior of the cylinder. Under otherwise the same conditions, a yield of phthalic anhydride of only 92% by weight is achieved.

Example 2

A cylindrical fluidized bed reactor as described in Example 1 is filled to the extent of three-quarters of its height with hollow spheres of the type described in Example 1.

5 liters of a catalyst consisting of zinc oxide having an inner surface of 12 sq. m./g. and a particle size of 0.2 to 0.5 mm. is introduced into the reactor. The catalyst is heated to 480° C. in three hours in a current of hydrogen and the said temperature is maintained for another four hours. The temperature in the reactor is then reduced to 370° C. and 1 kg. of cyclohexanol and 5 cu m. of hydrogen are introduced per hour. The end product consists of 83% by weight of cyclohexanone, 16.4% by weight of cyclohexanol, 0.2% by weight of hydrocarbons and 0.4% by weight of residue. The eliminated hydrogen is withdrawn.

Example 3

A reactor having a height of 0.4 meter and a diameter of 80 mm. is filled to the extent of three-quarters of its height with hollow spheres of the type described in Example 1.

1.5 liters of a finely divided catalyst of silicic acid containing 15% by weight of copper is introduced into the reactor. The catalyst has a particle size of 0.2 to 0.4 mm. 1,000 g. of nitrobenzene and 5 cu. m. of hydrogen are introduced per hour through three nozzles arranged in the bottom of the reactor.

The vapors and gases leaving the reactor are cooled in a water cooler. The condensate is collected in a separator in which it separates into two layers. One layer consists of pure aniline, which is free from nitrobenzene and is obtained in a yield of 99.8% based on nitrobenzene used, and the gas containing hydrogen is returned.

Example 4

5 liters of a catalyst of silicic acid containing 16.7% by weight of nickel, 5.6% by weight of copper and 1% by weight of manganese is charged to the reactor filled with spheres described in Example 1. The catalyst has a particle size of 0.3 to 0.5 mm. 300 g. of benzene and 4 cu. m. of hydrogen are introduced per hour into the bottom of the reactor. The temperature in the reactor is maintained at 220 to 230° C. and the pressure is adjusted to two atmospheres gauge. The reaction product is cooled and separated in a separator, the gas being returned to the reactor. The vaporous cyclohexane formed is separated from the hydrogen, cooled and separated in a separator. Pure cyclohexane is obtained in a yield of 99.5%.

Example 5

5 liters of a catalyst of active carbon containing 5% by weight of platinum and 2% of potassium carbonate is charged to the reactor filled with spheres described in Example 1. The catalyst has a particle size of 0.2 to 0.4 mm. 1 kg. of cyclohexanol and 5 cu. m. of hydrogen are introduced per hour into the bottom of the reactor. The temperature in the reactor is maintained at 400° C. The vaporous reaction product is separated from the hydrogen. The hydrogen formed in the reaction is separated and the same amount of hydrogen as originally introduced into the reactor is returned. The reaction product is cooled and consists of pure phenol which is obtained in a yield of 98% based on cyclohexanol used.

Example 6

100 ml. of anatase having a particle size of 0.1 to 0.3 mm. is impregnated with a solution of 20 g. of crystalline ferric nitrate in 50 ml. of water and dried at 100° C. The product is then again impregnated with a hot solution of 62 g. of ammonium molybdate in 45 ml. of water. The catalyst is dried at 100° C. and then calcined for three hours at 400° C.

200 ml. of this catalyst is charged to a reactor having a height of 1 meter and a diameter of 50 mm. which is filled with hollow spheres having a diameter of 15 mm. At a temperature of 330° C. 80 g. of vaporous methanol and 1,000 liters of air are supplied per hour from the bottom of the reactor through the fluidized catalyst.

72 g. of formaldehyde is isolated per hour from the gas mixture leaving the reactor. This is a yield of 96%.

We claim:

1. A process for contacting gasiform substances with finely divided, solid particles fluidized in upwardly flowing stream thereof which comprises passing upwardly said stream through a reaction zone at a rate sufficient to fluidize said particles therein, subdividing said zone by providing therein a packing of hollow, perforated spheres of a size sufficiently large to remain unifluidized in said stream, the perforations of said spheres being over the entire surface thereof and of diameters at least four times the diameter of said solid particles and said spheres being hollow spheres with spherical cavities, being inert toward and resistant to the components of said gas stream, and chemically reacting gaseous components of said stream in the subdivided reaction zone in the presence of the fluidized solid particles.

2. A process as claimed in claim 1 wherein said solid particles comprise catalysts for the reaction of the gaseous components.

3. A process as claimed in claim 1 wherein said gasiform substances comprise hydrogen and an organic substance to be hydrogenated in said reaction zone, and said finely divided, solid particles comprise a hydrogenation catalyst.

4. A process as claimed in claim 1 wherein said gasiform substances comprise air and an organic chemical to be oxidized in said reaction zone, and said finely divided solid particles comprise an oxidation catalyst.

5. A fluidized bed reactor for the gasiform reactions in the presence of finely divided, solid, fluidized particles comprising a vessel defining a reaction zone for a gaseous reaction in the presence of a finely divided, solid particles fluidized in an upwardly flowing gas stream, and a packing of hollow, perforated spheres in said zone, said spheres being hollow spheres with spherical cavities, being of a size sufficient to remain unfluidized in said gas stream, being inert toward and resistant to the components of said gas stream, and having perforations through their walls over the entire surface thereof with diameters at least four times the diameter of said solid particles.

6. A fluidized bed reactor as claimed in claim 5 wherein said spheres have diameters in the range of 10–65 mm.

7. A fluidized bed reactor as claimed in claim 5 wherein said diameters of said spheres is in the range of 1/100 to 1/15 of the diameter of said reactor.

8. A fluidized bed reactor as claimed in claim 5 wherein said spheres are composed of a material selected from the group consisting of metal and ceramic.

(References on following page)

References Cited

UNITED STATES PATENTS

| | | | |
|---|---|---|---|
| 2,631,921 | 3/1953 | Odell | 23—1 |
| 3,010,806 | 11/1961 | Berry | 23—1 |
| 2,664,337 | 12/1953 | Cornell | 23—1 |
| 2,783,249 | 2/1957 | Jaeger et al. | 260—346.4 |
| 2,795,629 | 6/1957 | Boedeker | 260—668 |
| 3,086,852 | 4/1963 | Fenske et al. | 260—606 |
| 3,205,275 | 9/1965 | Johnson | 260—346.4 |
| 3,210,378 | 10/1965 | Nonnenmacher et al. | 260—346.4 |
| 3,352,887 | 11/1967 | Riley et al. | 260—346.4 |

EDWARD STERN, *Primary Examiner.*

U.S. Cl. X.R.

23—284, 288; 260—346.4, 578, 606